US009539979B2

(12) United States Patent
Miyata et al.

(10) Patent No.: US 9,539,979 B2
(45) Date of Patent: Jan. 10, 2017

(54) PASSENGER AIRBAG, PASSENGER AIRBAG DEVICE, AND VEHICLE (75) Inventors: Yasuhito Miyata, Tokyo (JP); Masatoshi Nasui, Tokyo (JP)

(73) Assignee: TAKATA CORPORATION (JP)

( * ) Notice: Subject to any disclaimer, the term of this patent is extended or adjusted under 35 U.S.C. 154(b) by 0 days.

(21) Appl. No.: 14/344,633

(22) PCT Filed: Aug. 1, 2012

(86) PCT No.: PCT/JP2012/069559
§ 371 (c)(1),
(2), (4) Date: Mar. 13, 2014

(87) PCT Pub. No.: WO2013/038827
PCT Pub. Date: Mar. 21, 2013

(65) Prior Publication Data
US 2014/0353952 A1 Dec. 4, 2014

(30) Foreign Application Priority Data

Sep. 13, 2011 (JP) ................................. 2011-199581

(51) Int. Cl.
*B60R 21/2346* (2011.01)
*B60R 21/239* (2006.01)
(Continued)

(52) U.S. Cl.
CPC ......... *B60R 21/2346* (2013.01); *B60R 21/205* (2013.01); *B60R 21/239* (2013.01);
(Continued)

(58) Field of Classification Search
CPC ...... B60R 21/205; B60R 21/23; B60R 21/231; B60R 21/2334; B60R 21/2346; B60R 21/239
See application file for complete search history.

(56) References Cited

U.S. PATENT DOCUMENTS 5,927,748 A * 7/1999 O'Driscoll ............ B60R 21/233
280/729
6,439,603 B2 * 8/2002 Damman .............. B60R 21/276
280/736

(Continued)

FOREIGN PATENT DOCUMENTS

JP H03-281460 A 12/1991
JP H09-048307 A 2/1997
(Continued)

OTHER PUBLICATIONS

International Search Report from the International Bureau of WIPO for International Application No. PCT/JP2012/069559 dated Oct. 2, 2012 and English translation of the same (4 pages).

*Primary Examiner* — Barry Gooden, Jr.
(74) *Attorney, Agent, or Firm* — Fitch Even Tabin & Flannery LLP (57) ABSTRACT

A passenger airbag and a passenger airbag device in which when the passenger airbag starts to inflate with an interfering object close to the IP, gas in the airbag is caused to quickly flow out through vent holes to reduce the impact on the interfering object, and a vehicle equipped with this passenger airbag device. In case of front collision of the vehicle, an inflator is activated to generate gas, and the gas flows through a diffuser into an airbag main body. The diffuser inflates, and the diffuser and the airbag main body thereby start to deploy above the IP. In this early stage of deployment, the diffuser is quickly almost fully inflated, and gas discharge openings are located above the IP. The diffuser is provided with a depression, and the depression faces the interfering object M.

6 Claims, 7 Drawing Sheets (51) Int. Cl.
*B60R 21/205* (2011.01)
*B60R 21/235* (2006.01)

(52) U.S. Cl.
CPC .............. *B60R 2021/23509* (2013.01); *B60R 2021/23538* (2013.01)

(56) References Cited

U.S. PATENT DOCUMENTS

| | | | |
|---|---|---|---|
| 7,347,445 B2* | 3/2008 | Choi | B60R 21/233 280/729 |
| 7,748,738 B2* | 7/2010 | Schneider | 280/740 |
| 7,883,109 B2* | 2/2011 | Parks et al. | 280/739 |
| 7,931,298 B2* | 4/2011 | Parks et al. | 280/739 |
| 7,942,440 B2* | 5/2011 | Choi | B60R 21/231 280/729 |
| 8,061,734 B2* | 11/2011 | Parks et al. | 280/739 |
| 8,251,398 B2* | 8/2012 | Parks et al. | 280/739 |
| 8,419,056 B2* | 4/2013 | Parks et al. | 280/739 |
| 8,608,200 B2* | 12/2013 | Miyata | B60R 21/237 280/742 |
| 2001/0045734 A1* | 11/2001 | Damman | B60R 21/276 280/736 |
| 2003/0201628 A1 | 10/2003 | Roychoudhury et al. | |
| 2005/0052008 A1* | 3/2005 | Rose | B60R 21/2346 280/740 |
| 2006/0006633 A1* | 1/2006 | Bito | 280/740 |
| 2006/0049618 A1* | 3/2006 | Bito | 280/732 |
| 2007/0052222 A1* | 3/2007 | Higuchi et al. | 280/738 |
| 2007/0145730 A1* | 6/2007 | Choi | 280/740 |
| 2007/0262570 A1* | 11/2007 | Choi | 280/729 |
| 2008/0073891 A1* | 3/2008 | Rose | B60R 21/2338 280/739 |
| 2008/0073892 A1* | 3/2008 | Rose | B60R 21/2338 280/739 |
| 2008/0073893 A1* | 3/2008 | Schneider | 280/740 |
| 2008/0143086 A1* | 6/2008 | Higuchi | 280/736 |
| 2008/0303256 A1* | 12/2008 | Williams | 280/742 |
| 2009/0146403 A1* | 6/2009 | Fukawatase et al. | 280/732 |
| 2009/0160169 A1* | 6/2009 | Parks et al. | 280/742 |
| 2010/0117338 A1* | 5/2010 | Yamada et al. | 280/728.2 |
| 2011/0025032 A1* | 2/2011 | Parks et al. | 280/742 |
| 2011/0121549 A1* | 5/2011 | Parks et al. | 280/741 |
| 2011/0148078 A1* | 6/2011 | Tsujimoto | 280/728.3 |
| 2012/0032429 A1* | 2/2012 | Parks et al. | 280/739 |
| 2012/0274054 A1* | 11/2012 | Parks et al. | 280/739 |
| 2013/0154244 A1* | 6/2013 | Miyata | 280/730.1 |
| 2013/0313809 A1* | 11/2013 | Yamaji | 280/729 |

FOREIGN PATENT DOCUMENTS

| | | |
|---|---|---|
| JP | H10-071904 A | 3/1998 |
| JP | H11-005505 A | 1/1999 |
| JP | H11-115667 A | 4/1999 |
| JP | H11-198750 A | 7/1999 |
| JP | 2000-344038 A | 12/2000 |
| JP | 2003-320921 A | 11/2003 |
| JP | 4297001 B2 | 4/2009 |
| JP | 2011-011743 A | 1/2011 |
| JP | 2011-116211 A | 6/2011 |

* cited by examiner

PASSENGER AIRBAG, PASSENGER AIRBAG DEVICE, AND VEHICLE

CROSS-REFERENCE TO RELATED APPLICATIONS

This application is a U.S. national phase application filed under 35 U.S.C. §371 of International Application PCT/JP2012/069559, filed on Aug. 1, 2012, designating the United States, which claims priority from Japanese Patent Application No. 2011-199581, filed Sep. 13, 2011, which are hereby incorporated herein by reference in their entirety.

TECHNICAL FIELD

The present invention relates to a passenger airbag installed in an instrument panel (hereinafter abbreviated as IP) in front of a front passenger seat of a vehicle, and more specifically, it relates to a passenger airbag in which a diffuser is installed in an airbag main body. The present invention also relates to a passenger airbag device having this passenger airbag, and to a vehicle having this passenger airbag device.

BACKGROUND ART

Passenger airbags in which a diffuser is installed in an airbag main body to control the flow of gas from an inflator are described in Japanese Unexamined Patent Application Publication No. 11-198750 and Japanese Unexamined Patent Application Publication No. 10-71904. In Japanese Unexamined Patent Application Publication No. 11-198750, the flow direction of gas from an inflator is controlled in the left-right direction by a diffuser. In Japanese Unexamined Patent Application Publication No. 10-71904, gas discharge openings provided in a diffuser (referred to as "inner bag" in Japanese Unexamined Patent Application Publication No. 10-71904) face not straight toward the rear of the vehicle but obliquely upward and downward or obliquely leftward and rightward so that the airbag inflates softly for a front-seat passenger or a child in front of them. In this specification, "left-right direction" corresponds to the left-right direction of the vehicle body. "Left" and "right" are the left and right from the perspective of a front-seat passenger.

In Japanese Unexamined Patent Application Publication No. 11-5505, it is described that the inside of an airbag is divided into two upper and lower parts with a tether, and when the airbag interferes with an interfering object during the inflation of the airbag, gas in the upper part is caused to flow to the lower part through both left and right sides of the tether to reduce the impact on the interfering object.

PTL 3: Japanese Unexamined Patent Application Publication No. 11-5505

SUMMARY OF THE INVENTION

It is an object of the present invention to provide a passenger airbag and a passenger airbag device in which when the passenger airbag starts to inflate with an interfering object close to the IP, gas in the airbag is caused to quickly flow out through vent holes to reduce the impact on the interfering object, and a vehicle equipped with this passenger airbag device.

A passenger airbag of the present invention includes an airbag main body that is provided with vent holes in both side surfaces and that is provided with an inflator opening at a proximal end, and a diffuser that is disposed within the airbag main body and that has gas discharge openings for causing gas from an inflator to flow toward the sides of the airbag main body. A central part in the left-right direction of the diffuser in the inflated state is located closer to the proximal end than a left end and a right end.

In an embodiment of the present invention, in the early stage of inflation of the passenger airbag, the vent holes are located in extension directions of gas outflow directions through the gas discharge openings of the diffuser, and in the fully inflated state of the passenger airbag, the vent holes are located closer to the rear of the vehicle than the gas discharge openings.

It is preferable that the airbag main body be first folded into a primary folded body that is long in the left-right direction when mounted in the vehicle, and then be folded such that the left-right width is reduced, into a secondary folded body, and the vent holes be located near the side surfaces of the primary folded body and the secondary folded body.

It is preferable that in the fully inflated state of the diffuser, the distance between the left and right gas discharge openings be 230 to 440 mm, and the central part of the diffuser be located closer to the proximal end than the left end and right end by 50 to 160 mm.

It is preferable that the opening area of the gas discharge openings of the diffuser in the fully inflated state be 1.1 to 3.0 times the opening area of the vent holes.

It is preferable that the diffuser be formed by sewing together a first panel located closer to the rear of the vehicle when mounted in the vehicle and a second panel located closer to the front of the vehicle when mounted in the vehicle, and edges of the first panel and the second panel closer to the front end of the vehicle be sewn together with a main panel forming the airbag main body, on the side of the airbag main body closer to the front end of the vehicle.

A passenger airbag device of the present invention includes the above passenger airbag of the present invention and an inflator for inflating the passenger airbag.

A vehicle of the present invention includes such a passenger airbag device.

In the passenger airbag, passenger airbag device, and vehicle of the present invention, the inflator is activated upon a vehicular collision or the like, gas from the inflator flows through the diffuser into the airbag main body, and the airbag main body inflates. This gas flows out through the gas discharge openings of the diffuser toward the sides of the vehicle (the left-right direction), and the airbag first starts to inflate to the left and right. In the present invention, the central part in the left-right direction of the diffuser is lower than the left end and the right end of the diffuser, and therefore, when an interfering object exists close to the IP so as to face the central part of the diffuser, the flow of gas toward the interfering object is suppressed by the diffuser, and the input applied to the interfering object is reduced.

When the distance between the left and right gas discharge openings of the diffuser in the fully inflated state is about 230 to 440 mm, by making the central part of the diffuser lower than the left end and the right end by 50 mm or more, the flow of gas toward the central part is suppressed by the diffuser, and the input applied to the interfering object is reduced.

When the vent holes are located in extension directions of gas outflow directions through the gas discharge openings of the diffuser in the early stage of inflation, and when the airbag main body interferes with an interfering object in the early stage of inflation, gas from the gas discharge openings quickly flows out through the vent holes, and the input to the interfering object is reduced.

In the present invention, the airbag main body may be folded into a primary folded body that is long in the left-right direction, and may then be folded such that the left-right width is reduced, into a secondary folded body, and the vent holes may be located near the side surfaces of the primary folded body and the secondary folded body. When this folded passenger airbag is inflated by gas from the inflator, as described above, the airbag main body first inflates in the left-right direction of the vehicle. In the early stage of inflation in which the airbag main body is inflated in the left-right direction as described above, the vent holes are located near the side surfaces of the airbag main body. Therefore, gas from the gas discharge openings of the diffuser quickly flows out through the vent holes.

By making the opening area of the gas discharge openings of the diffuser in the fully inflated state greater than (for example, 1.1 to 3.0 times) the opening area of the vent holes, the vent holes are easily located on the extension lines of the gas outflow directions through the gas discharge openings during the inflation of the airbag. Therefore, when an interfering object is close, gas from the vent holes quickly flows out.

In an embodiment of the present invention, in the fully inflated state of the passenger airbag, the vent holes are located closer to the rear of the vehicle than the gas discharge openings of the diffuser. When this airbag inflates without interfering with an interfering object, the gas outflow from the vent holes decreases.

A passenger airbag in which a diffuser is formed by sewing together a first panel located closer to the rear of the vehicle and a second panel located closer to the front of the vehicle, and edges of the first panel and the second panel closer to the front end of the vehicle are sewn together with a main panel of an airbag main body is easy to manufacture because the number of sewing processes is small.

DETAILED DESCRIPTION OF THE PREFERRED EMBODIMENTS

An embodiment will be described below with reference to FIGS. 1 to 8.

As illustrated in FIGS. 1 to 6, this passenger airbag 1 has an airbag main body 10 and a diffuser 20 within the airbag main body 10. Vent holes 11 are provided in both left and right side surfaces of the airbag main body 10. An inflator opening 12 is provided in the bottom surface of the airbag main body 10 closer to the front end of the vehicle. T denotes a surface facing the passenger.

Figure 6:
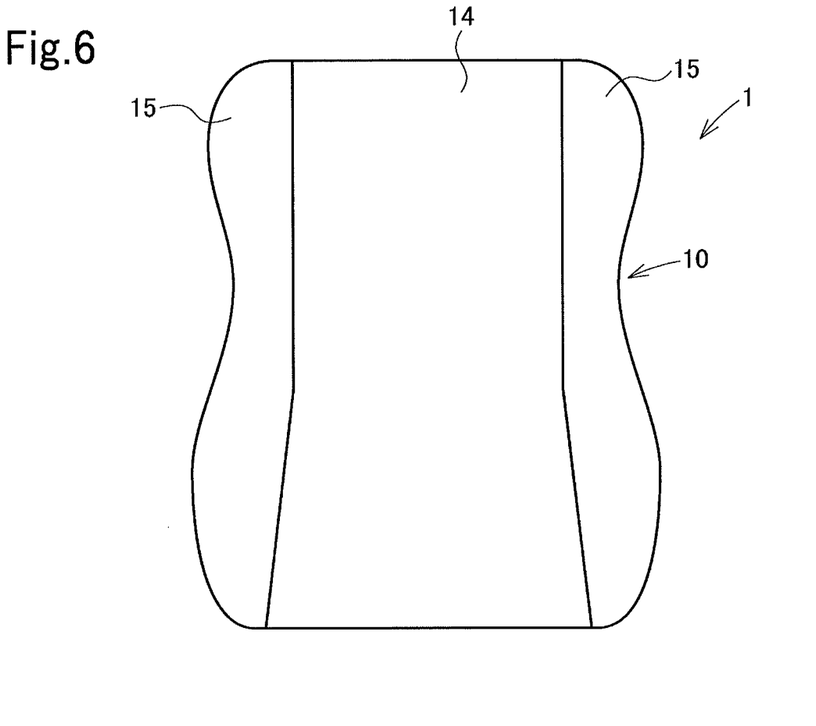
FIG. 6 is a front view of the passenger airbag according to the embodiment.

The airbag main body 10 is made by sewing together a center panel 14 as a main panel and left and right side panels 15, 15 as illustrated in FIG. 6. The center panel 14 forms the upper surface, the surface T facing the passenger, and the lower surface of the airbag main body 10 in the inflated state. The left and right side panels 15, 15 form the left and right side surfaces of the airbag main body 10. A vent hole 11 is provided in each side panel 15.

Figure 1:
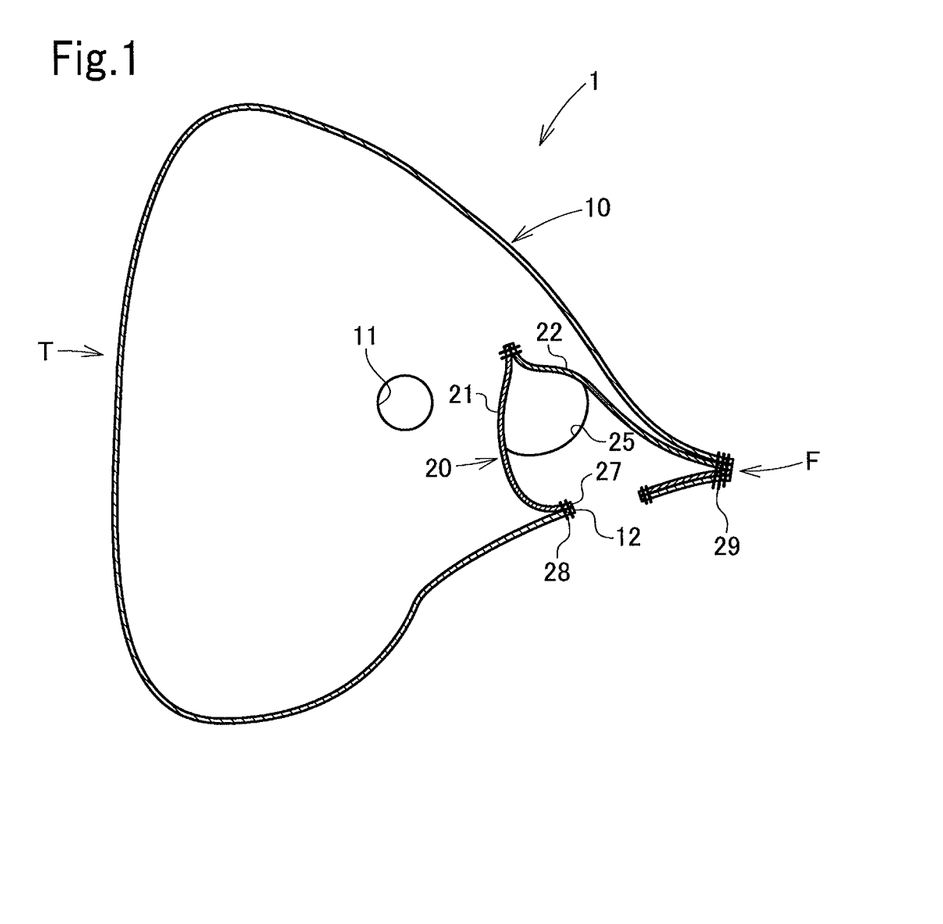
FIG. 1 is a vertical sectional view of a passenger airbag according to an embodiment taken along the front-rear direction of the vehicle.
Figure 2:
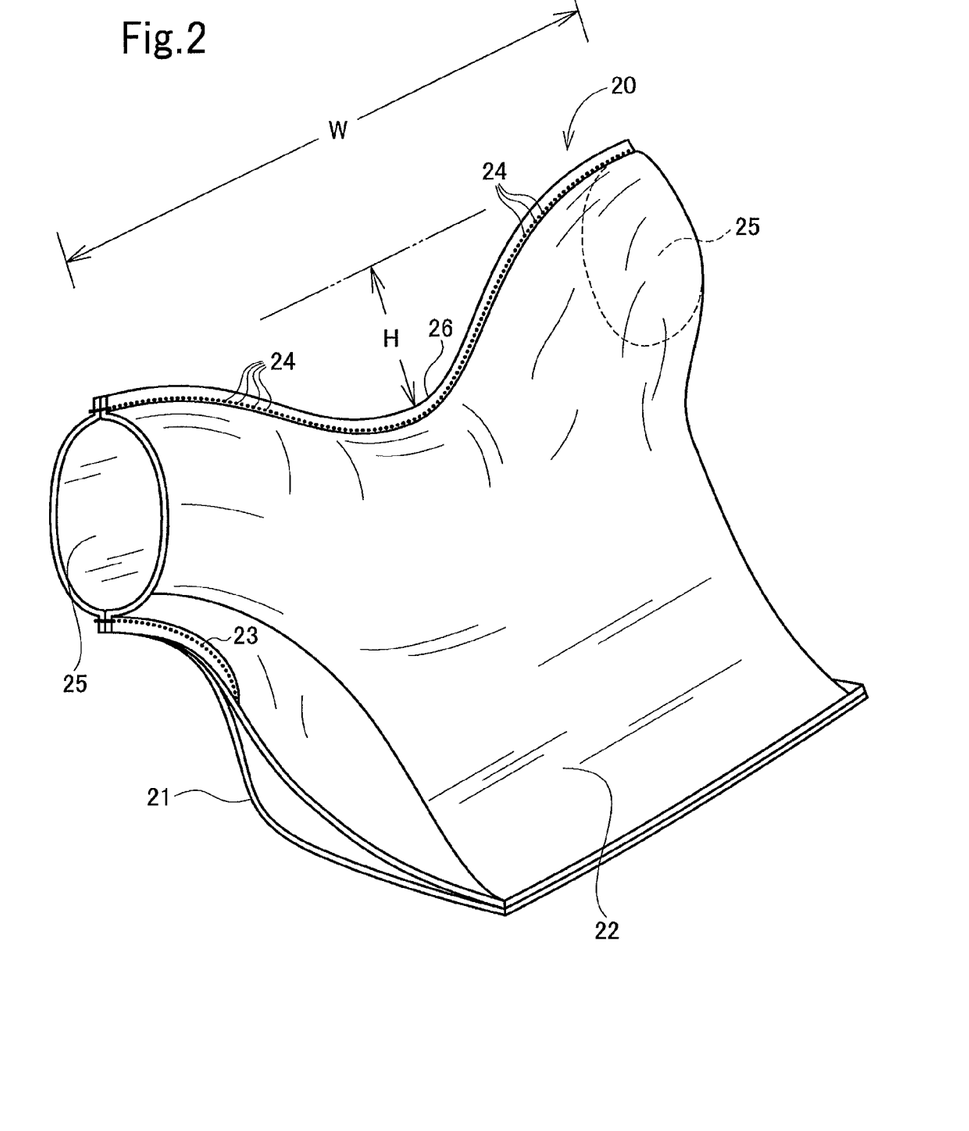
FIG. 2 is a perspective view of a diffuser.

The diffuser 20 is made by sewing together a first panel 21 on the rear side of the vehicle and a second panel 22 on the front side with seams 23 and 24 as illustrated in FIGS. 1 and 2. The seam 23 sews together the side edges of the panels 21 and 22, and the seam 24 sews together the upper edges of the panels 21 and 22.

Figure 3:
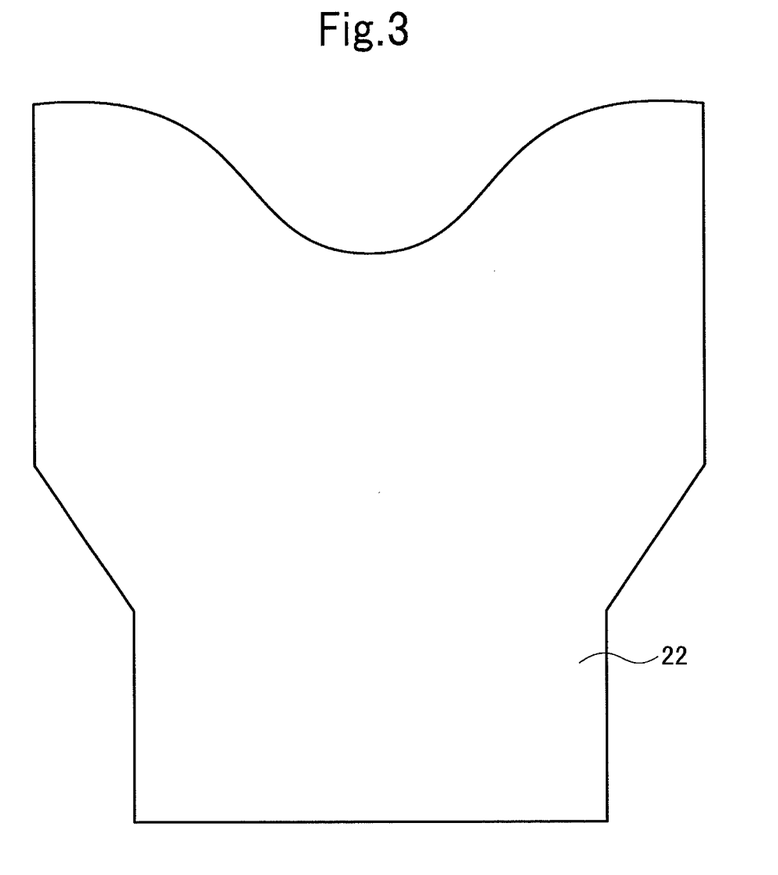
FIG. 3 is a plan view of a panel of the diffuser.
Figure 4:
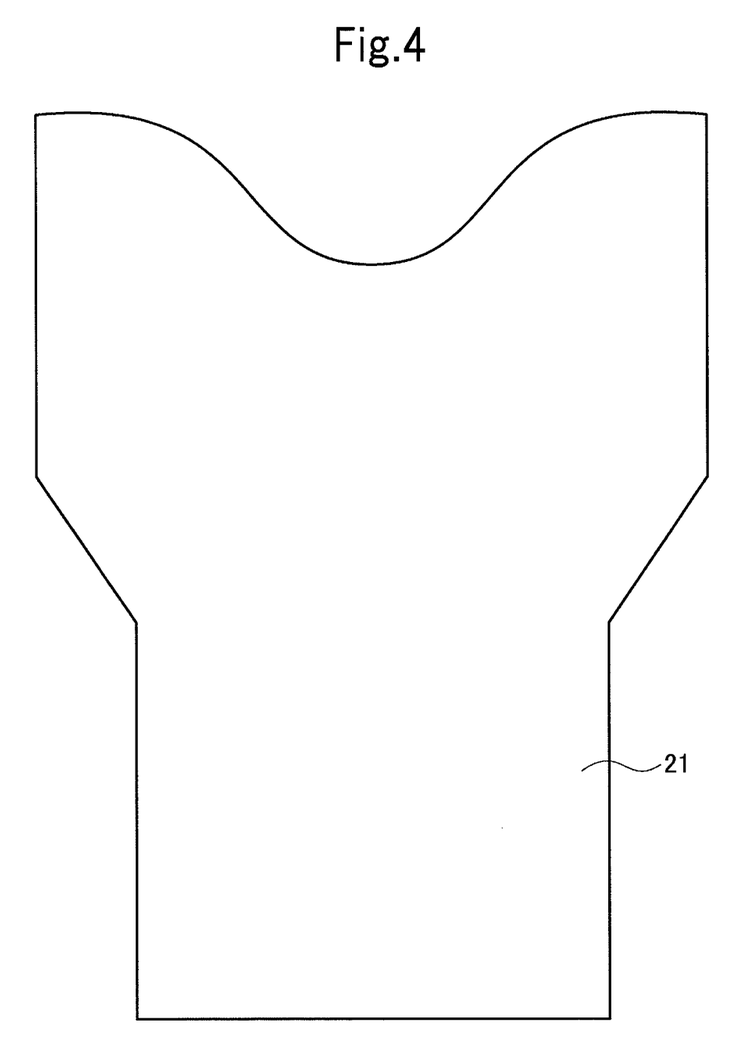
FIG. 4 is a plan view of a panel of the diffuser.
Figure 5:
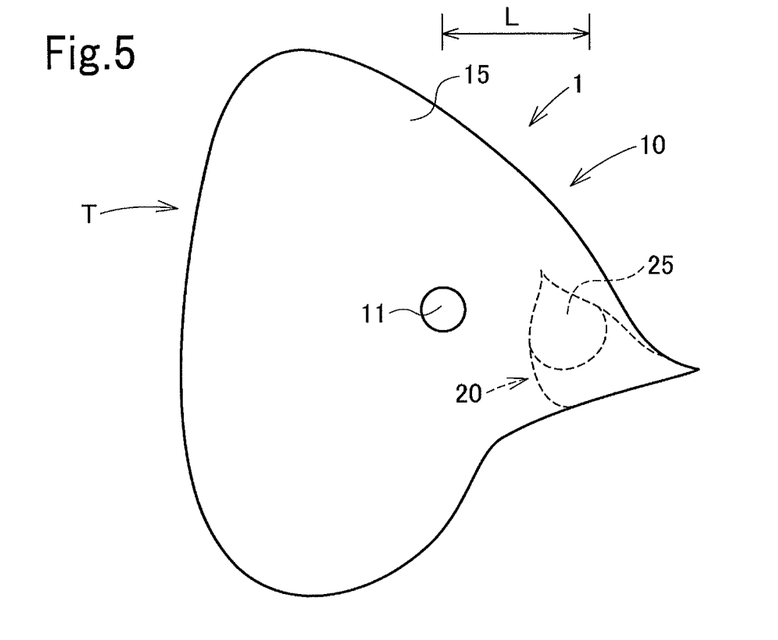
FIG. 5 is a side view of the passenger airbag according to the embodiment.

The panels 21 and 22 have a substantially Y shape the upper part of which is slightly protruding to the left and right as illustrated in FIG. 3. The seam 23 sews together the side edges of the panels 21 and 22 below the protruding portions of the upper parts of the panels 21 and 22. Gas discharge openings 25, 25 are thereby formed on the left and right of the upper part of the diffuser 20 as illustrated in FIG. 2.

As illustrated in FIG. 3, the panels 21 and 22 have such a shape that the central part of the upper edge is depressed, and therefore, as illustrated in FIG. 2, a depression 26 depressed toward the proximal end, that is, downward is formed in the center of the upper part of the diffuser 20 in the fully inflated state.

In the fully inflated state, the opening area of each gas discharge opening 25 is preferably about 1.1 to 3.0 times, especially about 1.3 to 2.0 times, the opening area of each vent hole 11. The opening area of each vent hole 11 is preferably about 12 to 51 $cm^2$, especially about 19 to 40 $cm^2$.

In the fully inflated state, the distance W between the left gas discharge opening 25 and the right gas discharge opening 25 is preferably about 230 to 440 mm, especially about 270 to 380 mm.

In addition, in the fully inflated state, the difference in height H between the upper ends of both left and right ends of the diffuser 20 and the lowest part of the depression 26 is preferably about 50 to 160 mm, especially about 70 to 130 mm.

The first panel 21 of the diffuser 20 is provided with an inflator opening 27 (FIG. 1) that is superimposed on the inflator opening 12 of the airbag main body 10, and the peripheral edges of the openings 21 and 27 are sewn together by a seam 28.

The passenger airbag 1 is made by sewing together the center panel 14, the side panels 15, the first and second panels 21 and 22, then turning inside out through an unsewn opening F (FIG. 1) of the airbag main body 10 closer to the front end of the vehicle, and then sewing up the opening F with a seam 29. The first and second panels 21 and 22 are sewn together with the center panel 14 by the seam 29. Since the first and second panels 21 and 22 are sewn together with the center panel 14 in this manner, the man-hours for sewing the airbag 1 can be reduced, and the air bag 1 can be manufactured easily.

The passenger airbag device is installed in the upper surface of the IP 32. The airbag main body 10 and the diffuser 20 are fastened to a retainer 31 such that the peripheral edges of the inflator openings 12 and 27 are interposed between a bag ring (FIG. 8) 31r and the bottom surface of the retainer 31.

In case of front collision of a vehicle equipped with this passenger airbag device, the inflator 30 is activated to generate gas, and the gas flows through the diffuser 20 into the airbag main body 10. The diffuser 20 inflates, a lid portion 33 (FIG. 7) of the IP 32 thereby starts to open, and the diffuser 20 and the airbag main body 10 start to deploy above the IP 32. In this early stage of deployment, the diffuser 20 is quickly almost fully inflated, and the gas discharge openings 25 are located above the IP 32. When an interfering object M is close to the passenger airbag device of the IP 32 during the inflation of the airbag, the inflated airbag main body 10 presses this interfering object M. However, since the diffuser 20 is disposed within the airbag main body 10, and gas from the inflator 30 flows through the gas discharge openings 25 of the diffuser 20 to the left and right, the airbag main body inflates mainly in the left-right direction, and the inflation toward the interfering object M is suppressed. In addition, the diffuser 20 is provided with the depression 26, and the depression 26 faces the interfering object M. Therefore, the pressing force (input) applied from the diffuser 20 and the airbag main body 10 to the interfering object M is reduced.

Figure 7:
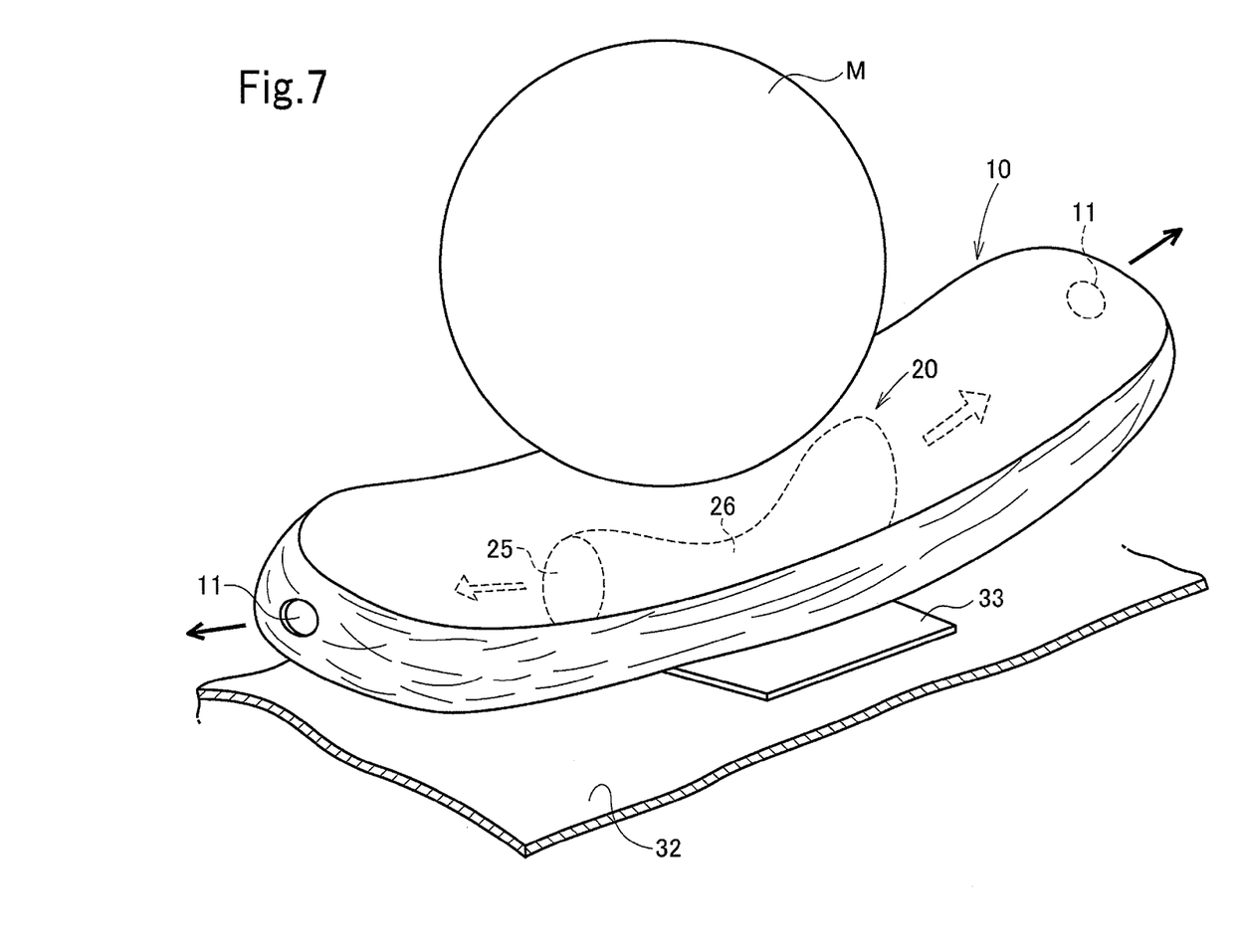
FIG. 7 is a perspective view of the passenger airbag during inflation as seen from the front of the vehicle.
Figure 8:
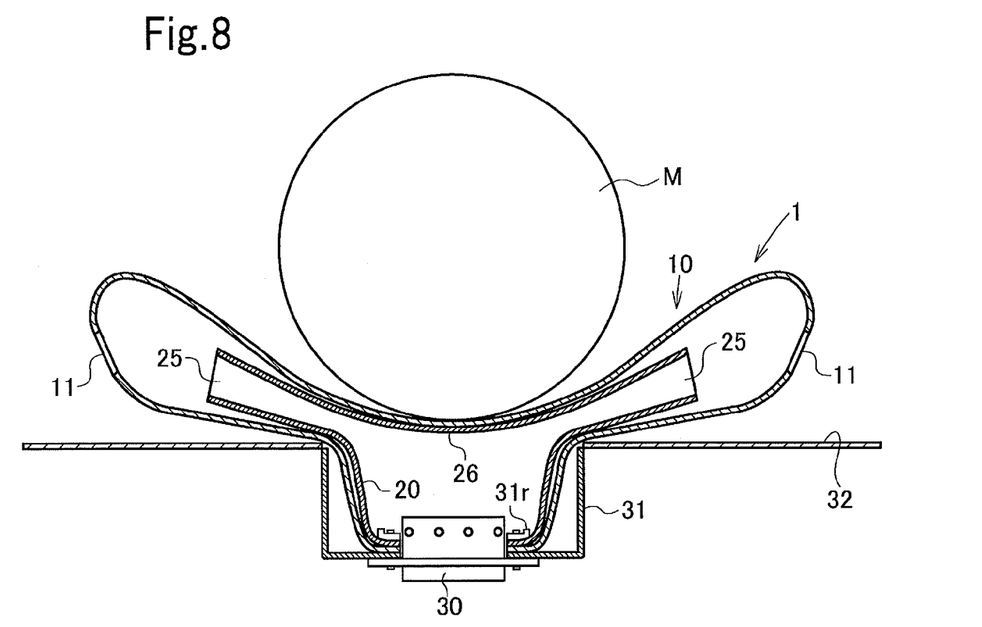
FIG. 8 is a vertical sectional view of the passenger airbag during inflation taken along the left-right direction.

In addition, in this embodiment, as illustrated in FIGS. 7 and 8, the vent holes 11 are located on the extension lines of the gas outflow directions through the gas discharge openings 25 of the diffuser 20 when the airbag main body 10 inflates in the left-right direction in the early stage of inflation. Therefore, gas flowing from the diffuser 20 into the airbag main body 10 goes straight ahead and quickly flows through the vent holes 11 to the airbag main body 10 side. Therefore, the inflation pressure of the airbag main body 10 is low. Also by this, the input applied to the interfering object M is reduced.

When there is no interfering object M, the airbag main body 10 quickly inflates from the state of FIGS. 7 and 8 toward the rear of the vehicle, and the vent holes 11 move so as to be located behind the gas discharge openings 25. Therefore, the gas discharge openings 25 and the vent holes 11 come out of alignment with each other, the gas outflow through the vent holes 11 decreases, and the airbag main body 10 quickly inflates to the fully inflated state. In the fully inflated state of FIG. 1, the vent holes 11 are preferably separated from the gas discharge openings 25 toward the rear of the vehicle by 80 mm or more, which is the distance between the centers of the openings of the vent holes 11 and the gas discharge openings 25.

In the present invention, a tether for restricting the left-right width of the inflated airbag main body may be provided.

Although the present invention has been described in detail by using a specific embodiment, it is obvious to those skilled in the art that various changes may be made without departing from the spirit and scope of the present invention.

The invention claimed is:

1. A passenger airbag comprising:
an airbag main body that is provided with vent holes in both side surfaces and that is provided with an inflator opening at a proximal end; and
a diffuser that is disposed within the airbag main body and that has left and right gas discharge openings for causing gas from an inflator to flow toward both sides of the airbag main body,
wherein a central part in a left-right direction of the diffuser in a fully inflated state is located closer to a proximal end than a left end and a right end,
wherein in the diffuser, in the fully inflated state, a distance between the left and the right gas discharge openings is 230 to 440 mm,
wherein the central part of the diffuser is located closer to the proximal end than the left end and the right end by 50 to 160 mm,
wherein the diffuser is formed by sewing together a first panel located closer to a rear of the vehicle when mounted in the vehicle and a second panel located closer to the front end of the vehicle when mounted in the vehicle, and
wherein edges of the first panel and the second panel closer to the front end of the vehicle are sewn together with a main panel forming the airbag main body, on a side of the airbag main body closer to the front end of the vehicle.

2. The passenger airbag according to claim 1, wherein an opening area of the gas discharge openings of the diffuser in the fully inflated state is 1.1 to 3.0 times an opening area of the vent holes.

3. A passenger airbag device comprising: the passenger airbag according to claim 1; and the inflator for inflating the passenger airbag.

4. A vehicle comprising: the passenger airbag device according to claim 3.

5. A passenger airbag comprising:
an airbag main body that is provided with vent holes in both side surfaces and that is provided with an inflator opening at a proximal end; and
a diffuser that is disposed within the airbag main body and that has gas discharge openings for causing gas from an inflator to flow toward both sides of the airbag main body,
wherein a central part in a left-right direction of the diffuser in a fully inflated state is located closer to a proximal end than a left end and a right end,
wherein an edge of the diffuser closer to a front end of the vehicle is connected to an edge of the airbag main body closer to the front end of the vehicle,
wherein the diffuser is formed by sewing together a first panel located closer to a rear of the vehicle when mounted in the vehicle and a second panel located closer to the front of the vehicle when mounted in the vehicle, and
wherein edges of the first panel and the second panel closer to the front end of the vehicle are sewn together with a main panel forming the airbag main body, on a side of the airbag main body closer to the front end of the vehicle,
wherein the first panel and the second panel each have, in their upper parts, a pair of protruding portions protruding in the left-right direction, and have such a substantially Y shape that the central part in the left-right direction of an upper edge is depressed,
wherein the upper edges of the first panel and the second panel are sewn together, and parts of left and right side edges closer to lower edges than the protruding portions, of the first panel and the second panel are sewn together,
wherein unsewn parts at distal ends in the protruding direction of the protruding portions form the gas discharge openings,
wherein the main panel has a center panel that forms an upper surface, a surface facing a passenger, and a lower surface of the airbag main body in the inflated state, and a pair of side panels that form left and right surfaces of the airbag main body, and wherein when manufacturing the airbag, the left and right surfaces of the center panel and peripheral edges of the side panels are sewn together, the upper edges and the side edges of the first panel and the second panel are sewn together, then the diffuser is disposed within the airbag main body through an opening closer to the front end of the vehicle between both unsewn ends of the center panel, and then both ends of the center panel and the lower edges of the first panel and the second panel are sewn together.

6. The passenger airbag according to claim 5, wherein the first panel is provided with an inflator opening, and peripheral edges of the inflator opening of the first panel and peripheral edges of the inflator opening of the airbag main body are sewn together.

\* \* \* \* \*